US008200964B2

(12) United States Patent
Perlman et al.

(10) Patent No.: US 8,200,964 B2
(45) Date of Patent: Jun. 12, 2012

(54) METHOD AND APPARATUS FOR ACCESSING AN ENCRYPTED FILE SYSTEM USING NON-LOCAL KEYS

(75) Inventors: Radia J. Perlman, Sammamish, WA (US); Sunay Tripathi, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 847 days.

(21) Appl. No.: 11/525,799

(22) Filed: Sep. 22, 2006

(65) Prior Publication Data

US 2008/0123858 A1    May 29, 2008

(51) Int. Cl.
*G06F 21/00* (2006.01)
(52) U.S. Cl. ....................................... 713/165
(58) Field of Classification Search .............. 705/71; 380/277, 281; 713/164–165, 194; 726/26–27
See application file for complete search history.

(56) References Cited

U.S. PATENT DOCUMENTS

| | | | | |
|---|---|---|---|---|
| 6,249,866 B1* | 6/2001 | Brundrett et al. | ............. | 713/165 |
| 6,363,480 B1* | 3/2002 | Perlman | ............. | 713/164 |
| 6,959,390 B1* | 10/2005 | Challener et al. | ............. | 713/194 |
| 7,069,591 B1* | 6/2006 | Weicher | ............. | 726/26 |
| 7,181,016 B2* | 2/2007 | Cross et al. | ............. | 380/281 |
| 2002/0136410 A1* | 9/2002 | Hanna | ............. | 380/277 |
| 2002/0169960 A1* | 11/2002 | Iguchi et al. | ............. | 713/174 |
| 2003/0033495 A1* | 2/2003 | Lawman et al. | ............. | 711/163 |
| 2003/0061494 A1* | 3/2003 | Girard et al. | ............. | 713/189 |
| 2003/0126434 A1* | 7/2003 | Lim et al. | ............. | 713/164 |
| 2003/0138105 A1* | 7/2003 | Challener et al. | ............. | 380/277 |
| 2003/0188179 A1* | 10/2003 | Challener et al. | ............. | 713/193 |
| 2004/0091114 A1* | 5/2004 | Carter et al. | ............. | 380/259 |
| 2005/0240995 A1* | 10/2005 | Ali et al. | ............. | 726/16 |

* cited by examiner

*Primary Examiner* — Gilberto Barron, Jr.
*Assistant Examiner* — Shaun Gregory
(74) *Attorney, Agent, or Firm* — Park, Vaughan, Fleming & Dowler LLP

(57) ABSTRACT

One embodiment of the present invention provides a system for accessing an encrypted file through a file system. During operation, the system receives a request to access the encrypted file. In response to the request, the system sends an encrypted file key for the encrypted file from the file system to a tamper-resistant module. Next, the tamper-resistant module uses a master secret to decrypt the encrypted file key to restore the file key, wherein the master secret is obtained from an external source by the tamper-resistant module. The system then uses the file key to access the encrypted file.

25 Claims, 5 Drawing Sheets

METHOD AND APPARATUS FOR ACCESSING AN ENCRYPTED FILE SYSTEM USING NON-LOCAL KEYS

BACKGROUND

1. Field of the Invention

The present invention relates to techniques for enhancing file system security. More specifically, the present invention relates to a technique for encrypting and decrypting files within a file system, wherein the technique uses a tamper-resistant module to perform encryption and decryption operations.

2. Related Art

Confidential data which resides on a file system can often be compromised by an attacker having physical access to the computer on which the file system resides, or by an attacker exploiting a security flaw in the file system. It can be extremely difficult to ensure that there are no exploitable flaws in a file system because modern file systems typically contain hundreds of thousands, or even millions of lines of code. Even if the file system itself is not flawed, the data on the file system still needs to be protected against someone who breaks into the computer system or who obtains physical access to the storage device upon which the files are stored. For example, an intruder could steal the hard drive and attach it to another computer running the same file system to obtain access to the files. Fortunately, such attacks can be effectively prevented by encrypting data at the file system level.

In an encrypted file system where encryption is done at the file system, the file system is typically entrusted to open any file. For example, the file system can maintain a set of master secrets, wherein each of the master secrets can lock/unlock many files. However, if a master secret is compromised by a malicious process, a large number of encrypted files can be compromised. Hence, it is desirable to keep master secrets in a safer place instead of on the file system itself, so that they cannot be stolen.

However, even if the master secrets are safely maintained outside of the file system, they are still vulnerable when they are used to access the files. For example, a master secret which is maintained outside of the file system may have to be sent to the file system to encrypt/decrypt files. Hence, an attacker can constantly monitor the file system, and can attack the file system when the master secret is being used by the file system.

Hence, what is needed is a method and an apparatus for securely accessing files through a file system without the above-described problems.

SUMMARY

One embodiment of the present invention provides a system for accessing an encrypted file through a file system. During operation, the system receives a request to access the encrypted file. In response to the request, the system sends an encrypted file key for the encrypted file from the file system to a tamper-resistant module (TRM). Next, the TRM uses a master secret to decrypt the encrypted file key to restore the file key, wherein the master secret is obtained from an external source by the TRM.

The system then uses the file key to decrypt the encrypted file. This decryption can take place either (1) at the file system or (2) within the TRM. To perform the decryption at the file system, the file key is first returned to the file system from the TRM. Next, the file system uses the file key to decrypt the encrypted file. In contrast, to perform the decryption within the TRM, the file system first sends the encrypted file to the TRM. The TRM then uses the file key to decrypt the encrypted file, and returns the decrypted file to the file system.

In a variation on this embodiment, prior to receiving the request to access the encrypted file, the system produces the encrypted file by: encrypting a file with the file key to produce the encrypted file; sending the file key to the TRM; using the master secret to encrypt the file key to produce an encrypted file key; returning the encrypted file key to the file system; and storing the encrypted file key along with the encrypted file in the file system.

In a variation on this embodiment, the master secret is a system administrator password which is known only to the system administrator.

In a variation on this embodiment, the TRM provides guaranteed physical protection.

In a variation on this embodiment, the file system communicates with the TRM through an encrypted communication session.

In a variation on this embodiment, the file system stores the encrypted file and the encrypted file key in non-volatile storage.

In a variation on this embodiment, prior to receiving the request to access the encrypted file, the system produces the encrypted file by: encrypting a file with the file key to produce the encrypted file; sending the file key to the TRM, which maintains a set of class keys associated with different classes of files; using a class key from the set of class keys to encrypt the file key to produce the encrypted file key; returning the encrypted file key to the file system; and storing the encrypted file key along with the encrypted file in the file system.

In a further variation on this embodiment, using the master secret to decrypt the encrypted file key involves using the class key to decrypt the encrypted file key, wherein the class key was obtained by using the master secret to decrypt an encrypted class key received from non-volatile storage.

In a further variation on this embodiment, an ephemerizer maintains a set of ephemerizer-class keys which correspond to the set of class keys. In this variation, the system stores the set of class keys in non-volatile storage by: encrypting each class key in the set of class keys with a corresponding ephemerizer-class key to produce a set of encrypted class keys; encrypting the set of encrypted class keys with the master secret, and storing the set of encrypted class keys, which are also encrypted with the master secret, in the non-volatile storage.

In a further variation on this embodiment, each ephemerizer-class key is associated with an expiration time. In this variation, the ephemerizer makes each ephemerizer-class key permanently unreadable at the associated expiration time.

DETAILED DESCRIPTION

Figure 1:
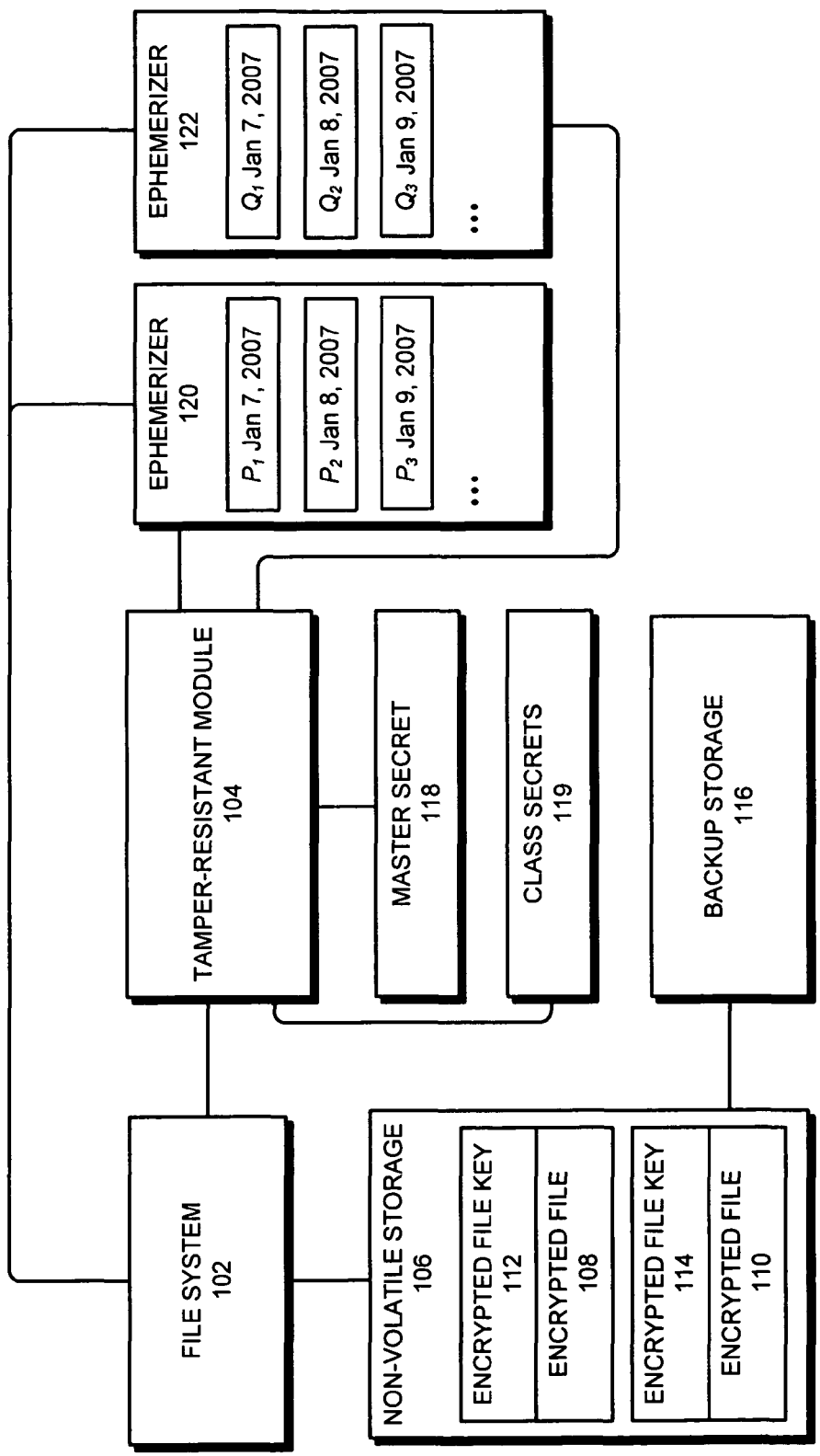
FIG. 1 illustrates a file system coupled to a TRM in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

If a file system is compromised by an adversary, one embodiment of the present invention ensures that the adversary is at most able to access only those files that have been decrypted at the time of the compromise. Specifically, one embodiment of the present invention utilizes an external master secret to lock/unlock the entire file system, wherein the master secret is for example maintained as a system-administrator password. Furthermore, the encryption/decryption operations involving the master secret are performed within a TRM located outside of the file system.

The file system maintains file keys, wherein each file key is used to encrypt/decrypt a corresponding file on the file system. The file keys are encrypted using the master secret, and the encrypted file keys are stored in the file system along with the associated files. The encryption (and subsequent) decryption of the file keys takes place in a TRM.

Note that this TRM has no important permanent state information. If the TRM fails, it can be replaced by a fresh module. Also, a single TRM can be concurrently used by multiple file systems. This way the individual file systems do not need special tamper-resistant hardware, and do not have to be physically protected. All of this physical protection can be concentrated in one TRM. Furthermore, it is not a serious problem if the TRM fails, because the TRM can be replaced with a new one. All the state information required to decrypt the encrypted files can be obtained from encrypted backup media, plus a system administrator's secret.

The file keys can be additionally encrypted with class keys, wherein each class key is used to encrypt/decrypt a class of files. These class keys can be encrypted with corresponding ephemerizer-class keys. Because the ephemerizer is also external to the file system, if the file system gets comprised, the attacker cannot access a large number of files without the associated ephemerizer class keys. Hence, this embodiment of the present invention provides a multi-level encryption technique which facilitates securely accessing files, so that even if the file system gets compromised, the damage is restricted to at most those opened files. Further, if an attacker obtains physical access to the computer system, the attacker cannot access the encrypted files.

File System and Tamper-Resistant Module

FIG. 1 illustrates a file system 102 coupled to a TRM 104 in accordance with an embodiment of the present invention. File system 102 can generally include any type of computer system or device that can manage files. All accesses to a set of files are performed through file system 102, which is trusted to enforce access restrictions.

File system 102 is coupled to TRM (TRM) 104. TRM 104 includes a computing device which provides guaranteed protection against physical attacks, as well as other types of non-invasive attacks. TRM 104 can be physically attached to file system 102. In this case, TRM 104 communicates with file system 102 through local buses.

Alternatively, TRM 104 can reside on a remote standalone system with guaranteed physical protection, e.g., on a machine which is locked in a vault in a central office. In this case, TRM 104 can communicate with file system 102 via a secure channel, e.g., through an encrypted communication session.

File system 102 is also coupled to non-volatile storage 106. Non-volatile storage 106 can generally include any type of non-volatile storage. This includes, but is not limited to, magnetic storage, which can include disk drives and magnetic tapes, flash memory, ROM, EPROM, EEPROM, and battery-backed-up RAM.

As illustrated in FIG. 1, file system 102 maintains copies of files 108 and 110 in encrypted form in non-volatile storage 106. File system 102 also maintains an encrypted file key 112 associated with encrypted file 108, and an encrypted file key 114 associated with encrypted file 110, in non-volatile storage 106. (Note that although only two files are illustrated in file system 102, in general file system 102 maintains a large number of files.)

File system 102 additionally maintains backup copies of encrypted files 108 and 110, as well as the associated encrypted file keys 112 and 114 in backup storage 116, which can include, but is not limited to a tape drive or a backup disk array. In one embodiment, backups of items in non-volatile storage 106 are periodically propagated from non-volatile storage 106 to backup storage 116.

Opening file system 102 is enabled by inputting master secret 118 into TRM 104, and if class keys 119 are used, additionally inputting data from non-volatile storage containing the encrypted class keys. In one embodiment of the present invention, master secret 118 is a system-administrator password known only by the system administrator. In another embodiment, master secret 118 is stored on a smartcard which has multiple tamper-resistant properties. Note that master secret 118 is maintained outside of file system 102.

TRM 104 can maintain a set of class keys, wherein each class key is associated with a different class of files. Similarly, ephemerizers 120 and 122 can each maintain a corresponding set of ephemerizer-class keys. (Ephemerizers 120 and 122 are described in more detail in U.S. patent application Ser. No. 10/959,928, filed on 5 Oct. 2004, entitled "Method and Apparatus for Using Secret Keys to Make Data Permanently Unreadable," by inventor Radia J. Perlman. This application is hereby incorporated by reference.)

If a class of files is intended to be securely deletable, the class key is encrypted with a corresponding ephemerizer-class key, and then encrypted with the master secret, and stored in non-volatile storage.

In one embodiment of the present invention, each ephemerizer-class key in ephemerizers 120 and 122 is associated with an expiration time as is illustrated in FIG. 1. Each ephemerizer-class key expires at the associated expiration time, which causes the associated class key to become unrecoverable, which causes all file keys for files of that class to become unrecoverable, which causes all files in that class to become unrecoverable. Hence, file system 102 can use class keys to encrypt those files which should be deleted when they are no longer needed, including all the copies of the files on backup storage 106.

TRM 104 can receive items, including files and file keys, from file system 102, and can locally perform all encryption and decryption operations involving the class keys.

Note that although the following discussion is written in terms of a single ephemerizer, in general multiple ephemerizers could be used, each with different sets of ephemerizer-class keys. For example, in a one-out-of-n scheme, a class key X would be separately stored, encrypted with a different ephemerizer-class key for each ephemerizer (e.g., $P_N$ and $Q_N$). Or, X could be broken up into n shares for recovery in a k-out-of-n scheme, with each share stored encrypted with one of the ephemerizers' class keys.

Note that file system 102 and TRM 104 can interact through a secure channel, whether it be a physically protected channel or a cryptographically protected channel.

Encrypting a File without Using a Class Key

Figure 2:
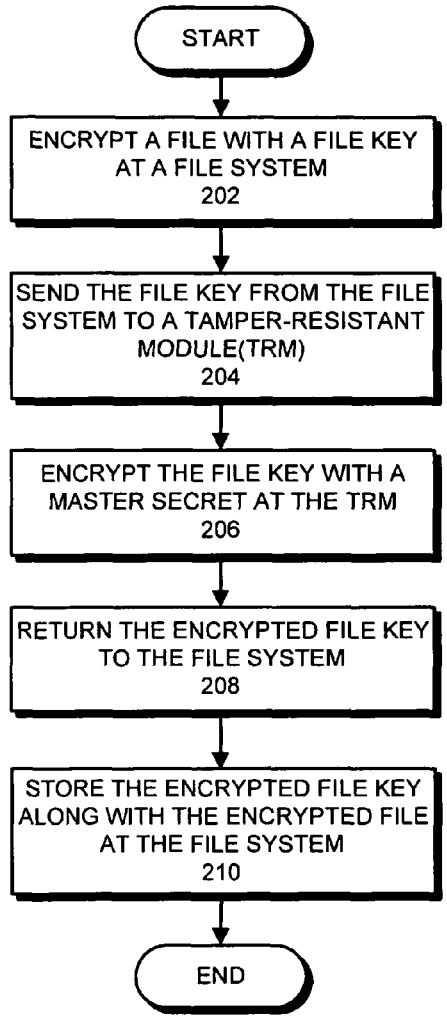
FIG. 2 presents a flowchart illustrating the process of encrypting a file in accordance with an embodiment of the present invention.

FIG. 2 presents a flowchart illustrating the process of encrypting a file in accordance with an embodiment of the present invention.

The system starts by encrypting the file with the associated file key to produce the encrypted file (step 202). In one embodiment of the present invention, the system encrypts the file using the associated file key at the file system.

Next, the system sends the file key from the file system to a TRM (step 204). In one embodiment of the present invention, the file key is sent through a secure channel between the file system and the TRM, for example, through an encrypted communication session.

At the TRM, the system encrypts the file key with a master secret to produce an encrypted file key (step 206).

The system next returns the encrypted file key back to the file system (step 208). In one embodiment of the present invention, the encrypted file key is sent through a secure communication channel between the file system and the TRM. The file system then stores the encrypted file key along with the encrypted file (step 210). In one embodiment of the present invention, both the encrypted file and the encrypted file key are stored in a non-volatile storage attached to the file system. Note that if either the encrypted file or the associated encrypted file key is stolen later by an adversary, the adversary cannot access the content of the file without obtaining the master secret.

Accessing an Encrypted File without Using a Class Key

Figure 3:
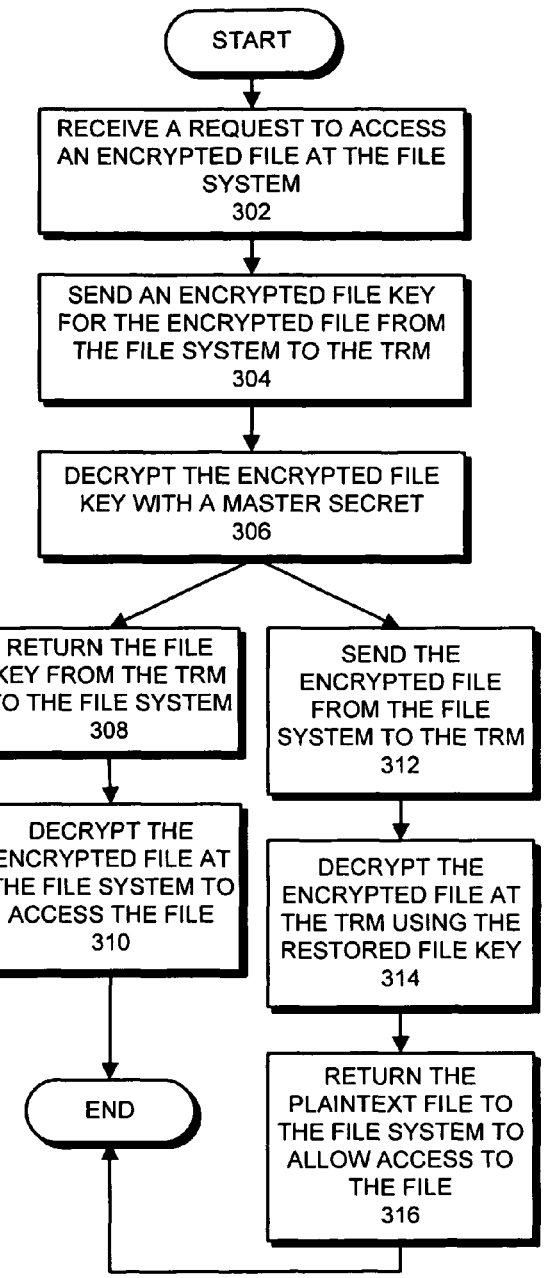
FIG. 3 presents a flowchart illustrating the process of accessing an encrypted file at the file system in accordance with an embodiment of the present invention.

FIG. 3 presents a flowchart illustrating the process of accessing an encrypted file in accordance with an embodiment of the present invention.

During operation, the system receives a request to access the encrypted file at the file system (step 302).

In response to the request, the system sends an encrypted file key associated with the encrypted file from the file system to the TRM (step 304). In one embodiment of the present invention, the encrypted file and the associated encrypted file key are produced using the procedure illustrated in FIG. 2.

Next, at the TRM, the system decrypts the encrypted file key with a master secret to restore the file key (step 306), wherein the master secret used here is the same one used to encrypt the file key.

Next, the system can take two different approaches to decrypt the encrypted file.

In the first approach, the system returns the restored file key to the file system from the TRM (step 308). Next, the system decrypts the encrypted file using the restored file key at the file system to access the requested file (step 310).

In the second approach, instead of returning the restored file key to the file system, the system sends the corresponding encrypted file from the file system to the TRM (step 312). The system then decrypts the encrypted file at the TRM with the restored file key to restore the plaintext file (step 314). Next, the system returns the plaintext file back to the file system, and subsequently accesses the plaintext file at the file system (step 316).

Note that in both of the above-described approaches, the file system is not involved in the file key encryption and decryption operations, which are performed at the TRM. Hence, the file system never has access to the master secret. However in the first approach, only the file decryption is performed at the file system, whereas in the second approach, both file key decryption and file decryption are performed at the TRM. As a result, the file key is always maintained in the encrypted form at the file system in the second approach.

Encrypting a File and a File Key Using a Class Key

Figure 4:
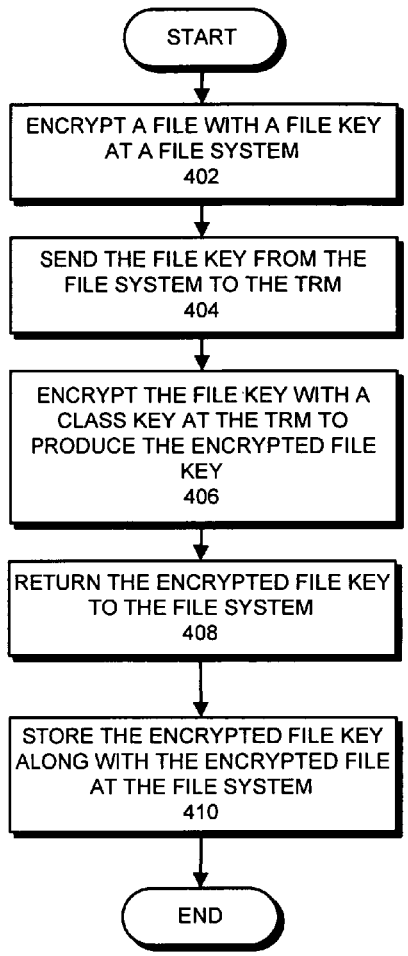
FIG. 4 presents a flowchart illustrating the process of encrypting a file using an ephemerizer in accordance with an embodiment of the present invention.

FIG. 4 presents a flowchart illustrating the process of encrypting a file using a class key in accordance with an embodiment of the present invention.

The system starts by encrypting the file with the associated file key to produce the encrypted file (step 402). In one embodiment of the present invention, the system encrypts the file using the associated file key at the file system.

Next, the system sends the file key from the file system to the TRM, together with an indication of the file's class (step 404). In one embodiment of the present invention, the file key is sent through a secure channel between the file system and the TRM, for example, an encrypted communication session.

At the TRM, the system encrypts the file key with a class key to produce the encrypted file key (step 406). Note that the system selects the class key from the set of class keys based on the corresponding file type.

Next, the system returns the encrypted file key to the file system (step 408) and subsequently stores the encrypted file key along with the encrypted file at the file system (step 410). In one embodiment of the present invention, both the encrypted file and the encrypted file key are stored in non-volatile storage.

Accessing an Encrypted File Using a Class Key

Figure 5:
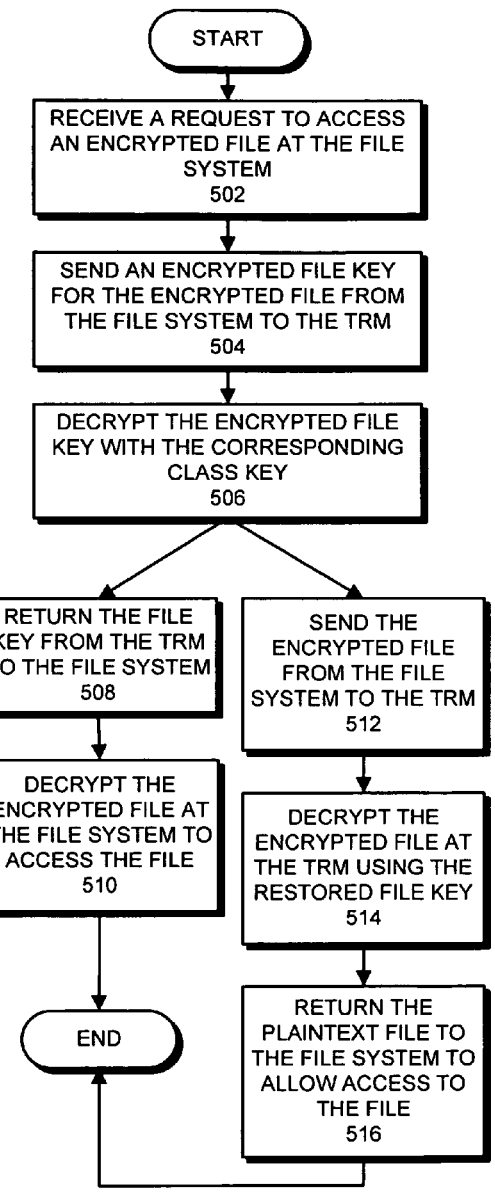
FIG. 5 presents a flowchart illustrating the process of accessing an encrypted file using an ephemerizer in accordance with an embodiment of the present invention.

FIG. 5 presents a flowchart illustrating the process of accessing an encrypted file using the TRM in accordance with an embodiment of the present invention.

During operation, the system receives a request to access the encrypted file at the file system (step 502).

In response to the request, the system sends an encrypted file key associated with the encrypted file from the file system to the TRM (step 504). Note that the encrypted file key was created by using a class key in accordance with the encryption procedure described in the flow chart in FIG. 4.

At the TRM, the system decrypts the encrypted file key using the corresponding class key (step 506).

Next, the system can take two different approaches to decrypt the encrypted file.

In the first approach, the system returns the file key from the TRM to the file system (step 508). Next, the system decrypts the encrypted file using the restored file key at the file system to access the requested file (step 510).

In the second approach, instead of returning the restored file key to the file system, the system sends the associated encrypted file from the file system to the TRM (step 512). The system then decrypts the encrypted file at the TRM with the restored file key thereby restoring the plaintext file (step 514). Next, the system returns the plaintext file back to the file system, and subsequently accesses the plaintext file at the file system (step 516).

Note that the TRM maintains copies of the class keys in encrypted form on non-volatile storage. Hence, if the TRM is destroyed, a new replacement TRM can be swapped in and the class keys can be restored from the non-volatile storage using the master secret, and, if for classes that are securely deletable, by requesting decryption from one or more ephemerizers, to continue performing all the above-described functions.

Encrypting Class Keys

Figure 6:
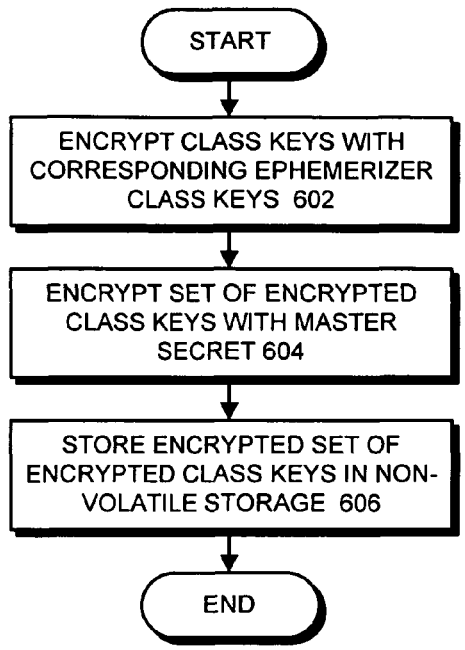
FIG. 6 presents a flowchart illustrating the process of encrypting and storing class keys in accordance with an embodiment of the present invention.

FIG. 6 presents a flowchart illustrating the process of encrypting and storing class keys in accordance with an embodiment of the present invention. At the beginning of the process, the TRM starts off with one or more class keys associated with different classes of files. During the encryption process, each class key is optionally encrypted with a corresponding ephemerizer class key if the class is to be assuredly deletable (step 602). Next, the set of encrypted class keys is encrypted with the master secret (step 604). Finally, the resulting encrypted set of encrypted class keys is stored in non-volatile storage (step 602). At this point, if the TRM fails, the class keys can be reconstructed from the information contained in non-volatile storage as is described below.

In one embodiment of the present invention, the class keys are associated with different expiration times and the ephemerizer is configured to make a corresponding ephemerizer-class key permanently unreadable at a corresponding expiration time. Note that making an ephemerizer-class key unreadable at an expiration time effectively deletes the associated files encrypted with the corresponding class key at the expiration time.

Note that encrypting the file key with a class key (which is itself encrypted with a master secret) adds an extra level of protection to the file system. Furthermore, combining an ephemerizer with the TRM facilitates deleting files when they are no longer needed. Note that to ensure the effectiveness of the ephemerizer in deleting files, the files (and all copies of the files) are stored only in the encrypted form at the file system or on backup storage.

Mounting a File System

Figure 7:
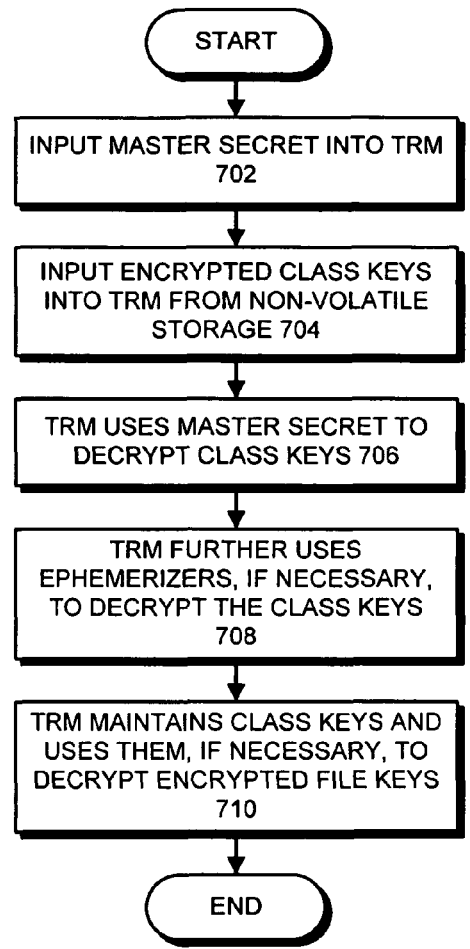
FIG. 7 presents a flowchart illustrating the process of mounting a file system in accordance with an embodiment of the present invention.

FIG. 7 presents a flowchart illustrating the process of mounting a file system in accordance with an embodiment of the present invention.

First, the master secret is inputted into the TRM (step 702). This can be done in a number of ways. (1) The master secret can be a system administrator's password, which is typed into a keyboard associated with the TRM by the system administrator. (2) The master secret can be a high-quality secret stored directly on any of the system administrator's smart cards, and a system administrator can activate his smart card using some other factor (such as biometric or PIN), and can input the smart card into the TRM, so that the master secret can be read into the TRM. (3) The master secret can be a high-quality secret that is stored, encrypted with the system administrator's secret, and is made accessible to the TRM by inputting both encrypted backup media containing the encrypted master secret, and the system administrator's secret into the smart card. (Note that any time a system administrator's secret is used, it can be obtained through a quorum scheme where k out of n system administrators need to input a secret or insert their activated smart card into a system.)

The system also inputs encrypted class keys into the TRM from non-volatile storage (step 704).

Next, the TRM uses the master secret to decrypt the class keys (step 706).

The TRM further uses ephemerizers, if necessary, to decrypt the class keys (step 708). This can involves sending the encrypted class keys to the ephemerizer and in return receiving decrypted class keys from the ephemerizer.

Next, the TRM maintains the class keys and uses them, if necessary, to decrypt encrypted file keys (step 708).

Adding a Class

Figure 8:
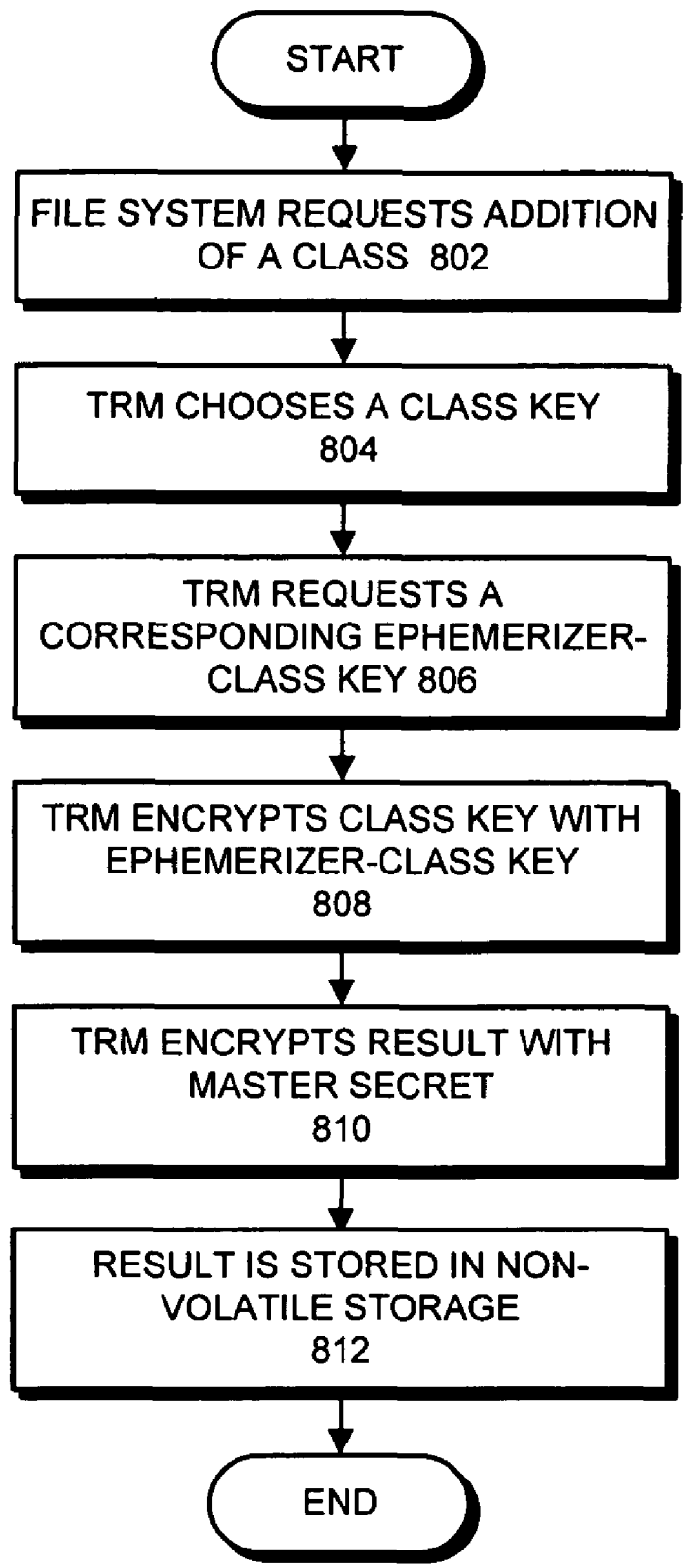
FIG. 8 presents a flowchart illustrating the process of adding a class in accordance with an embodiment of the present invention.

FIG. 8 presents a flowchart illustrating the process of adding a class in accordance with an embodiment of the present invention. First, the file system requests the addition of a class (step 802). Next, the TRM chooses a class key (step 804). The TRM also requests a corresponding ephemerizer-class key (for deletable classes) (step 806). Next, the TRM encrypts the class key with the ephemerizer-class key (step 808). Finally, the TRM encrypts the result with the master secret (step 810) and stores it in non-volatile storage (step 812).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for accessing an encrypted file through a file system, comprising:
   mounting the file system, wherein mounting the file system comprises inputting a master secret in a tamper-resistant module;
   receiving a request at the file system to access the encrypted file, wherein the encrypted file and an encrypted file key for the encrypted file are stored in the file system;
   in response to the request,
      sending the encrypted file key for the encrypted file from the file system to the tamper-resistant module outside of, and physically separate from, the file system, wherein the tamper-resistant module does not store the encrypted file or the encrypted file key for the encrypted file;
      using the master secret to decrypt the encrypted file key at the tamper-resistant module to restore the file key;
      wherein the master secret is obtained from an external source by the tamper-resistant module, and wherein the master secret is not stored in a memory within a computer system in which the file system operates, and hence the file system never has access to the master secret; and
   using the file key to access the encrypted file.

2. The method of claim 1, wherein using the file key to access the encrypted file involves:
   returning the file key to the file system from the tamper-resistant module;
   using the file key to decrypt the encrypted file at the file system; and
   accessing the decrypted file at the file system.

3. The method of claim 1, wherein using the file key to access the encrypted file involves:
   sending the encrypted file from the file system to the tamper-resistant module;
   using the file key to decrypt the encrypted file at the tamper-resistant module;
   returning the decrypted file to the file system; and
   accessing the decrypted file at the file system.

4. The method of claim 1, wherein prior to receiving the request to access the encrypted file, the method further comprises producing the encrypted file by:
   encrypting a file with the file key to produce the encrypted file;
   sending the file key to the tamper-resistant module;
   using the master secret to encrypt the file key to produce an encrypted file key;
   returning the encrypted file key to the file system; and
   storing the encrypted file key along with the encrypted file in the file system.

5. The method of claim 1, wherein the master secret is a system administrator password which is known only to the system administrator.

6. The method of claim 1, wherein the file system communicates with the tamper-resistant module through an encrypted communication session.

7. The method of claim 1, wherein the file system stores the encrypted file and the encrypted file key in non-volatile storage.

8. The method of claim 1, wherein prior to receiving the request to access the encrypted file, the method further comprises producing the encrypted file by:
   encrypting a file with the file key to produce the encrypted file;
   sending the file key to the tamper-resistant module, which maintains a set of class keys, wherein the class keys are associated with different classes of files;
   using a class key from the set of class keys to encrypt the file key to produce the encrypted file key;
   returning the encrypted file key to the file system; and
   storing the encrypted file key along with the encrypted file in the file system.

9. The method of claim 8, wherein using the master secret to decrypt the encrypted file key involves using the class key to decrypt the encrypted file key, the class key having been previously obtained by using the master secret to decrypt an encrypted class key received from non-volatile storage.

10. The method of claim 8,
    wherein an ephemerizer maintains a set of ephemerizer-class keys which correspond to the set of class keys; and
    wherein the method further comprises storing the set of class keys in non-volatile storage by,
       encrypting each class key in the set of class keys with a corresponding ephemerizer-class key to produce a set of encrypted class keys,
       encrypting the set of encrypted class keys with the master secret, and
       storing the set of encrypted class keys, which are also encrypted with the master secret, in the non-volatile storage.

11. The method of claim 10,
    wherein each ephemerizer-class key is associated with an expiration time; and
    wherein the ephemerizer makes each ephemerizer-class key permanently unreadable at the associated expiration time.

12. A non-transitory computer-readable storage medium storing instructions that when executed by a computer cause the computer to perform a method for accessing an encrypted file through a file system, the method comprising:
    mounting the file system, wherein mounting the file system comprises inputting a master secret in a tamper-resistant module;
    receiving a request at the file system to access the encrypted file, wherein the encrypted file and an encrypted file key for the encrypted file are stored in the file system;
    in response to the request,
       sending the encrypted file key for the encrypted file from the file system to the tamper-resistant module outside of, and physically separate from, the file system, wherein the tamper-resistant module does not store the encrypted file or the encrypted file key for the encrypted file;
       using the master secret to decrypt the encrypted file key at the tamper-resistant module to restore the file key;
       wherein the master secret is obtained from an external source by the tamper-resistant module, and wherein the master secret is not stored in a memory within a computer system in which the file system operates, and hence the file system never has access to the master secret; and
       using the file key to access the encrypted file.

13. The computer-readable storage medium of claim 12, wherein using the file key to access the encrypted file involves:
    returning the file key to the file system from the tamper-resistant module;
    using the file key to decrypt the encrypted file at the file system; and
    accessing the decrypted file at the file system.

14. The computer-readable storage medium of claim 12, wherein using the file key to access the encrypted file involves:
    sending the encrypted file from the file system to the tamper-resistant module;
    using the file key to decrypt the encrypted file at the tamper-resistant module;
    returning the decrypted file to the file system, and
    accessing the decrypted file at the file system.

15. The computer-readable storage medium of claim 12, wherein prior to receiving the request to access the encrypted file, the method further comprises producing the encrypted file by:
    encrypting a file with the file key to produce the encrypted file;
    sending the file key to the tamper-resistant module;
    using the master secret to encrypt the file key to produce an encrypted file key;
    returning the encrypted file key to the file system; and
    storing the encrypted file key along with the encrypted file in the file system.

16. The computer-readable storage medium of claim 12, wherein the master secret is a system administrator password which is known only to the system administrator.

17. The computer-readable storage medium of claim 12, wherein the tamper-resistant module provides guaranteed physical protection.

18. The computer-readable storage medium of claim 12, wherein the file system communicates with the tamper-resistant module through an encrypted communication session.

19. The computer-readable storage medium of claim 12, wherein the file system stores the encrypted file and the encrypted file key in non-volatile storage.

20. The computer-readable storage medium of claim 12, wherein prior to receiving the request to access the encrypted file, the method further comprises producing the encrypted file by:
- encrypting a file with the file key to produce the encrypted file;
- sending the file key to the tamper-resistant module, which maintains a set of class keys, wherein the class keys are associated with different classes of files;
- using a class key from the set of class keys to encrypt the file key to produce the encrypted file key;
- returning the encrypted file key to the file system; and
- storing the encrypted file key along with the encrypted file in the file system.

21. The computer-readable storage medium of claim 20, wherein using the master secret to decrypt the encrypted file key involves using the class key to decrypt the encrypted file key, the class key having been previously obtained by using the master secret to decrypt an encrypted class key received from non-volatile storage.

22. The computer-readable storage medium of claim 20, wherein an ephemerizer maintains a set of ephemerizer-class keys which correspond to the set of class keys; and wherein the method further comprises storing the set of class keys in non-volatile storage by,
- encrypting each class key in the set of class keys with a corresponding ephemerizer-class key to produce a set of encrypted class-keys,
- encrypting the set of encrypted class keys with the master secret, and
- storing the set of encrypted class keys, which are also encrypted with the master secret, in the non-volatile storage.

23. The computer-readable storage medium of claim 22, wherein each ephemerizer-class key is associated with an expiration time; and wherein the ephemerizer makes each ephemerizer-class key permanently unreadable at the associated expiration time.

24. An apparatus that accesses an encrypted file through a file system, comprising:
- a tamper-resistant module;
- a mounting mechanism configured to mount the file system, wherein mounting the file system comprises inputting a master secret in the tamper-resistant module;
- a receiving mechanism configured to receive a request at the file system to access the encrypted file, wherein the encrypted file and an encrypted file key for the encrypted file are stored in the file system;
- a sending mechanism configured to send the encrypted file key for the encrypted file from the file system to the tamper-resistant module outside of, and physically separate from, the file system, wherein the tamper-resistant module does not store the encrypted file or the encrypted file key for the encrypted file;
- a decryption mechanism configured to use the master secret to decrypt the encrypted file key at the tamper-resistant module to restore the file key;
- wherein the master secret is obtained from an external source by the tamper-resistant module, and wherein the master secret is not stored in a memory within a computer system in which the file system operates, and hence the file system never has access to the master secret; and
- an access mechanism configured to use the file key to access the encrypted file.

25. The method of claim 8, wherein mounting the file system comprises inputting data from non-volatile storage containing the class keys.

* * * * *